(12) United States Patent
Chen

(10) Patent No.: US 6,598,412 B1
(45) Date of Patent: Jul. 29, 2003

(54) INTERCHANGEABLE ADAPTERS FOR PIPE FREEZER APPARATUS

(75) Inventor: Limin Chen, Melville, NY (US)

(73) Assignee: Spectronics Corporation, Westbury, NY (US)

(*) Notice: Subject to any disclaimer, the term of this patent is extended or adjusted under 35 U.S.C. 154(b) by 0 days.

(21) Appl. No.: 10/152,560

(22) Filed: May 21, 2002

(51) Int. Cl.⁷ .................................................. F25D 3/00
(52) U.S. Cl. ........................... 62/293; 165/67; 180/68.4
(58) Field of Search ............................ 62/293; 165/67, 165/78; 180/68.4

(56) References Cited

U.S. PATENT DOCUMENTS

| | | | | |
|---|---|---|---|---|
| 3,742,723 A | * | 7/1973 | Grise | 62/293 |
| 4,112,706 A | * | 9/1978 | Brister | 62/293 |
| 4,267,699 A | * | 5/1981 | Bahrenburg | 62/293 |
| 4,428,204 A | * | 1/1984 | Brister | 62/293 |
| 4,944,161 A | * | 7/1990 | Van Der Sanden | 62/293 |
| 5,548,965 A | * | 8/1996 | Chen et al. | 62/293 |
| 5,680,770 A | * | 10/1997 | Hall et al. | 62/293 |
| 5,836,167 A | * | 11/1998 | Clouston et al. | 62/293 |
| 6,141,972 A | * | 11/2000 | Evans | 62/293 |
| 6,286,329 B1 | * | 9/2001 | Radichio | 62/293 |
| 6,434,952 B2 | * | 8/2002 | Wagner | 62/293 |

* cited by examiner

Primary Examiner—William E. Tapolcai
Assistant Examiner—Mohammad M. Ali
(74) Attorney, Agent, or Firm—Drinker Biddle & Reath LLP

(57) ABSTRACT

A set of interchangeable adapters for coupling an evaporation head of a pipe freezer apparatus with pipes of different diameters is described. Each adapter includes a thermally conductive body having a first surface defining a first channel shaped and sized to securely and releasably receive the evaporation head. The body of each adapter also has at least one pipe-engaging surface defining a substantially semicircular pipe channel conforming to a selected standard pipe diameter. In a preferred embodiment, the set includes a plurality of adapter pairs, each adapter of a pair having pipe channels of the same radii as its mate and each pair having pipe channels of different radii than those of the other pairs. Thus, the set of interchangeable adapters is well suited for holding a pair of evaporation heads in thermal communication with pipes of several different diameters.

19 Claims, 8 Drawing Sheets

INTERCHANGEABLE ADAPTERS FOR PIPE FREEZER APPARATUS

CROSS-REFERENCE TO RELATED APPLICATIONS

This application claims the benefit of U.S. application Ser. No. 09/921,353 filed on Aug. 2, 2001.

FIELD OF THE INVENTION

This invention relates generally to portable apparatus for freezing the liquid contents of pipes for working on the pipe, and to the more particular field of portable pipe freezers that use a refrigerant cycle for cooling the pipe.

BACKGROUND OF THE INVENTION

Pipe freezers are used in repairing or replacing pipe sections or repairing or adding fittings. When there is no convenient shut-off valve, the effect of blocking flow in the pipe can be achieved by freezing the water in a section of the pipe. The frozen section acts as an ice plug that blocks flow.

Some pipe freezer devices use frozen $CO_2$ (dry ice) for the heat transfer to freeze the section of pipe. This invention however, relates to devices that use a refrigerant in a refrigeration cycle for the heat transfer. Such devices are described, for example, in U.S. Pat. No. 5,548,965 and its counterparts DE 196 17 619.0 and GB 2,301,661. The same patent describes an evaporator head with multiple channels sized to fit various standard pipe diameters. Two evaporator heads are connected to a portable condenser/compressor unit by flexible coaxial tubes that cycle refrigerant to and from the evaporation chambers.

This invention improves upon the pipe freezer of U.S. Pat. No. 5,548,965 by structural differences that make it easier to install the evaporator heads in some situations; specifically the use of interchangeable adapters that slide onto the evaporator chambers to adapt the head for pipes of different diameters. The invention further adds internal structural differences that improve the distribution and flow path of the refrigerant along the pipe section, and thus improve the evaporation heat exchange.

SUMMARY OF THE INVENTION

The invention is in an apparatus for freezing the contents of a pipe through the use of a refrigeration cycle. The apparatus includes a portable condenser/compressor unit and a pair of flexible coaxial hoses connected to an evaporation chamber. A set of interchangeable adapters, each configured with one or more nearly semicircular channels conforming to a standard pipe diameter are used to place the evaporation chamber along and in heat transfer conduction with a section of a pipe. The adapters are configured to hold the evaporation chamber in a position such that the length axis of the chamber is aligned parallel to the axis of the pipe. The evaporation chamber has its coupling for the refrigerant hose located along its length dimension. The coupling orients the hose such that the hose is generally perpendicular to the length axis of the evaporation chamber. This angle of connection into the adapter makes it easier to install the evaporator head to a pipe when the pipe is close to a wall or structure that interferes with the hose being aligned parallel to the pipe.

Inside the evaporation chamber, a baffle may be placed between the outlet of the inner tube of the hose and the return to the outer tube. The baffle forces refrigerant sprayed out of the inner tube to migrate from essentially the entry point of the chamber to an end wall and then back toward the entry point before entering the outer tube. This long migration path allows more efficient evaporation in the chamber and thus more efficient heat exchange.

In a preferred embodiment, the evaporation chamber is in the shape of a right cylinder closed by a pair of end plates. A set of interchangeable adapters has on each adapter a channel of greater than semicircular arc and a radius just slightly larger than that of the cylindrical chamber to provide a conformal "slide-on" fit over the cylindrical chamber. The channel defines an open slot that allows the adapter to slide past the hose coupling. The slot does not need to run the entire length of the channel, but should at least extend past the hose coupling. The channel is less than 360° and is preferably has a less than about 330° arc so that the slot is large enough to allow some rotational movement of the chamber within the adapter channel to facilitate connection to the pipe.

The evaporation chamber is constructed of a heat conductive metal, preferably aluminum. In a preferred embodiment, the evaporation chamber is protected from dents and scratches by installing over it a replaceable open cylindrical sleeve. When the sleeve is used, the adapters are sized to provide a slide-on conformal fit over the sleeve.

DETAILED DESCRIPTION OF SEVERAL EMBODIMENTS OF THE INVENTION

The invention is in improvements to a portable pipe freezer apparatus as disclosed in U.S. Pat. No. 5,548,965. The description of the preferred embodiments of that patent are adopted herein by reference so that it will not be necessary to repeat common elements. In brief description, however, FIG. 9 (reproduced from U.S. Pat. No. 5,548,965) shows the basic elements of that prior portable pipe freezer apparatus.

Figure 9:
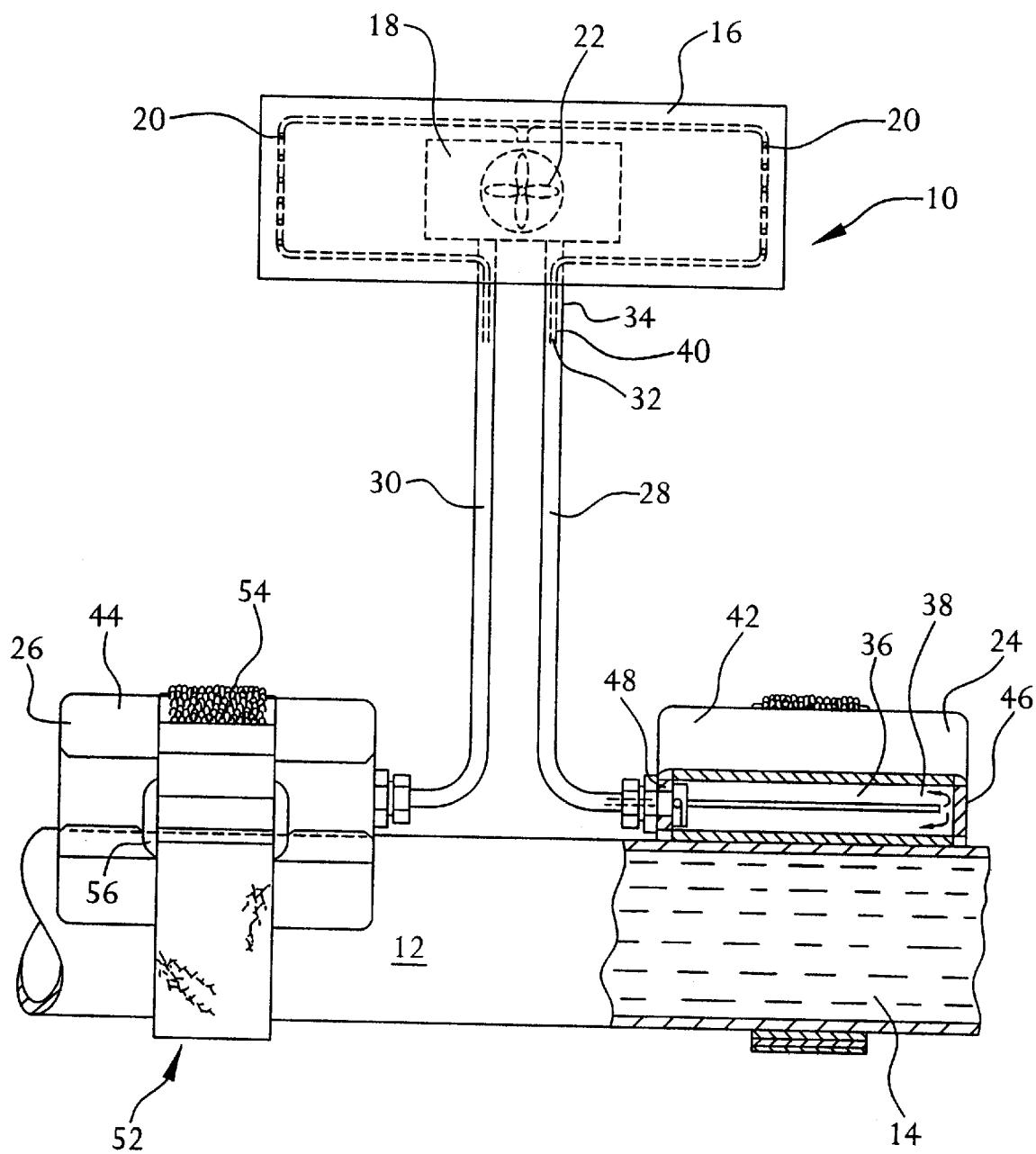
FIG. 9 is a schematic view of the prior art portable pipe freezer of U.S. Pat. No. 5,548,965.

Referring to FIG. 9, the pipe freezer apparatus system (10) is installed on a pipe (12) to freeze the water (14) inside a section of pipe to form an ice plug. The piper freezer includes a portable condenser/compressor unit (16) that has a compressor (18), a pair of condensers (20), and a fan (22). The condenser /compressor unit is connected to a pair of evaporators (24 and 26) by flexible coaxial hoses (28 and 30, respectively). The coaxial hoses have an inner tube (32) and an outer tube (34). The inner tube delivers high-pressure liquid refrigerant to an evaporation chamber and the outer tube returns refrigerant vapor from the evaporation chamber to the condenser/compressor unit.

In the well-known refrigeration cycle, liquid refrigerant (36) under high pressure enters through the inner tube (32) into an inner chamber (38) of the evaporators. The inner tube extends well into the chamber and acts as a metering device to spray the liquid refrigerant into the low-pressure inner chamber of the evaporators. As the refrigerant evaporates, it absorbs heat from the evaporator (24) and by conduction heat exchange from the adjacent pipe and the water inside the pipe. The refrigerant vapor is drawn from the evaporator through the outer tube (34) by suction and returned into the compressor 18, which raises the pressure of the vapor. The high pressure vapor passes through a condenser, in which the vapor is exposed to a large cooling surface area from which heat is convected by the fan (22). The refrigerant (36) is cooled to the condensation temperature, releases its heat of condensation and changes phase back into a liquid at high pressure to complete the cycle.

Figure 1:
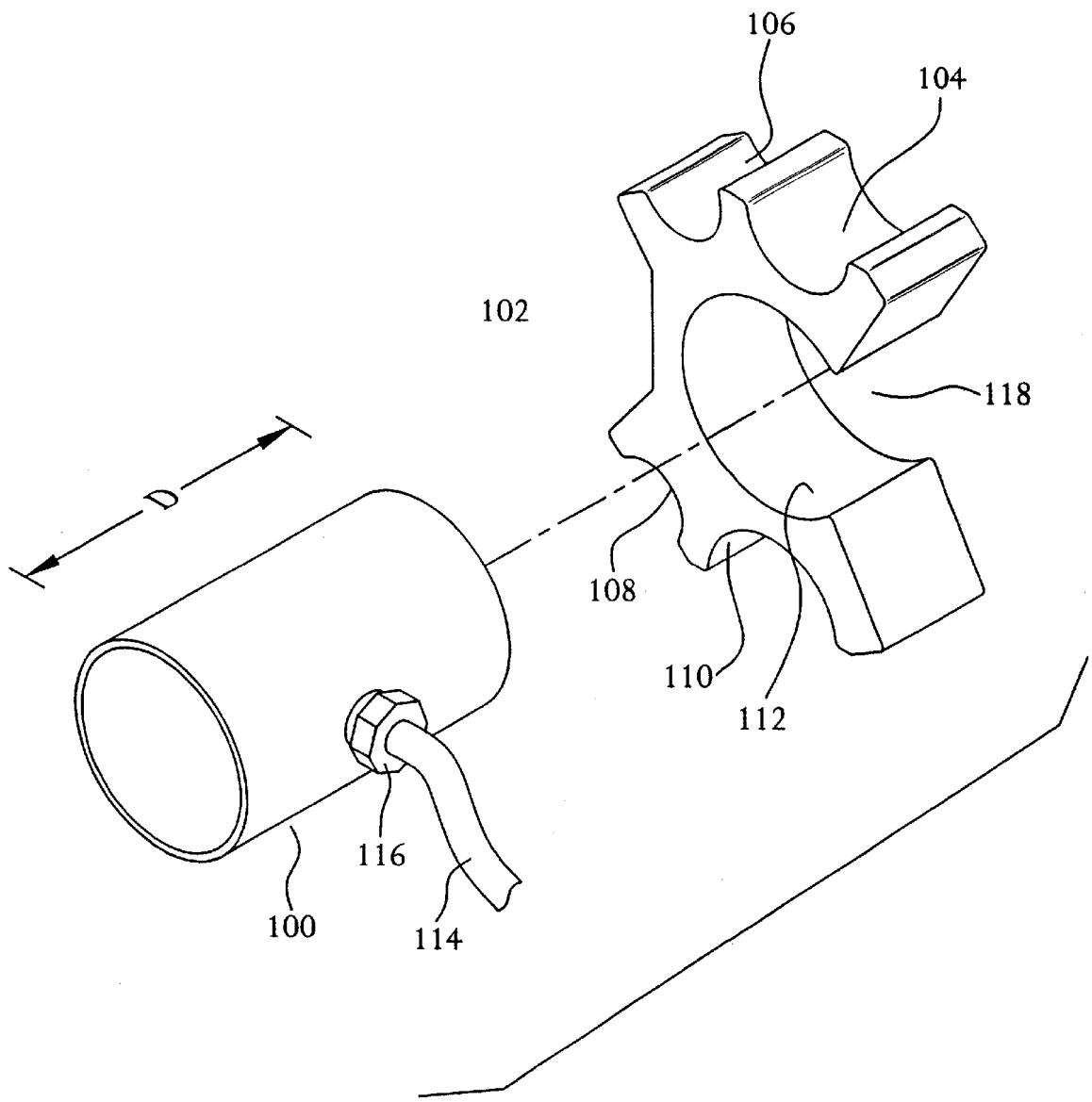
FIG. 1 is a perspective view of a cylindrical evaporator chamber and one of a set of adapters for different standard diameters of pipe.

This invention changes the configuration of the evaporators. As shown in FIG. 1, the evaporation chamber is inside a metal cylinder 100 or evaporator head. The evaporator head is provided with a set of interchangeable adapters to fit pipes of different standard diameters. The adapter 102 in FIG. 1 has different-sized, nearly semi-circular channels (104, 106, 108 and 110) for a conforming fit along relatively small (e.g., 15 mm, 18 mm, 22 mm and 28 mm) diameter pipes. It would be sufficient, however, to provide a different adapter for each pipe diameter.

The adapter 102 also has a greater than semicircular channel 112 having a radius sufficient to make a slide-on conforming fit over the outer surface of the evaporator head to receive the evaporator head and to hold the evaporator chamber in a position such that the length axis ("D" in FIG. 1) is aligned parallel to the axis of a pipe placed in any of the semicircular channels.

The coaxial hose (114) does not enter along the end of the cylinder, but rather enters through a hose coupling (116) that is located approximately midway along the length (D) of the cylinder. The hose coupling directs the inner tube of the hose generally perpendicular to the length axis of the evaporation chamber. The hose could be made to enter the chamber at a more acute angle, although there is no apparent advantage to do so.

The channel 112 on the adapter has a arc of greater than 180 degrees, but preferably not more than about 330 degrees, so that the cylindrical evaporator head can slide into the channel with the hose and hose coupling in the slot 112 that is left open. It is most preferable to have the slot extend even further to permit the cylinder to rotate inside the coupling through about 45 degrees so that the hose can be positioned according to the space and obstacles around the pipe. The connection to the evaporator in a direction generally perpendicular to the pipe permits the freezer unit to be used in more confined space than orienting the hoses along the axis of the pipe, as in the prior pipe freezer.

Figure 2:
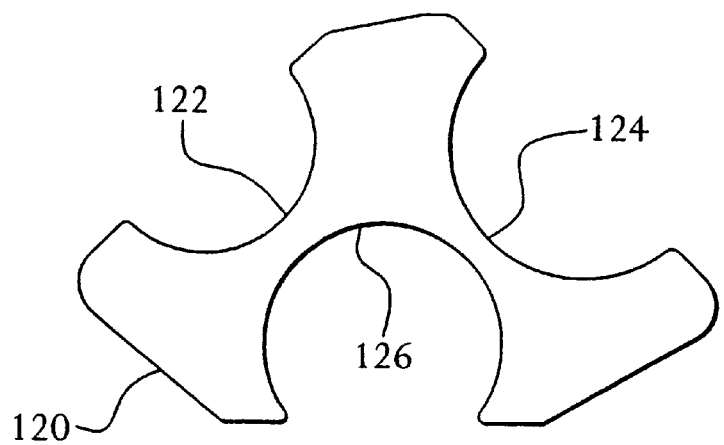
FIG. 2 is a profile view of another adapter.
Figure 3:
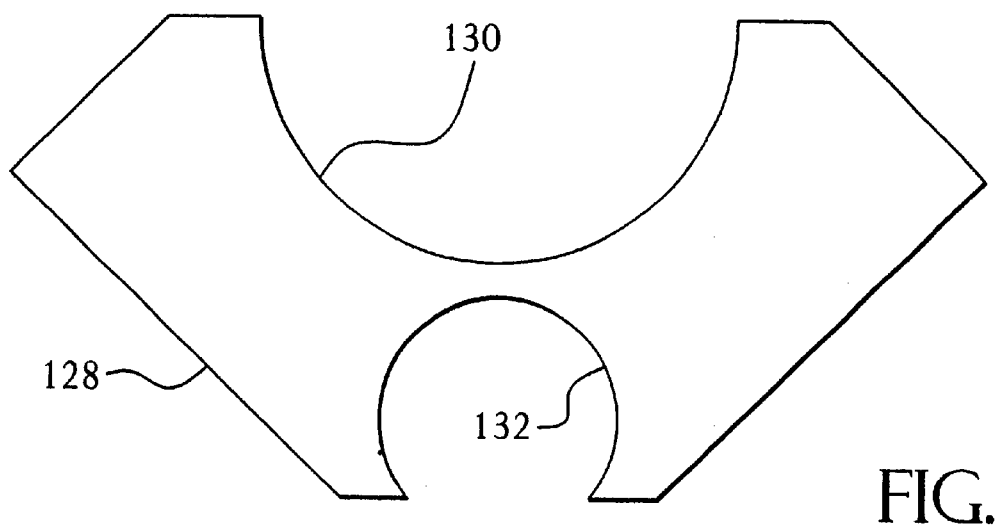
FIG. 3 is a profile view of another adapter.

Other adapters in the set are shown in FIGS. 2 and 3. The adapter (120) of FIG. 2 has two nearly semi-circular channels (124 and 122) conforming to the outer diameter of intermediate sized pipes (e.g. 35 mm and 42 mm, or 48 mm and 60 mm)). The adapter (128) of FIG. 3 has a single nearly semi-circular channel (130) for a relatively large pipe (e.g. 73 mm or higher.). The greater than semi-circular channel (126 and 132) for the evaporator head is the same as the channel (112) on the adapter 102 of FIG. 1.

Figure 4:
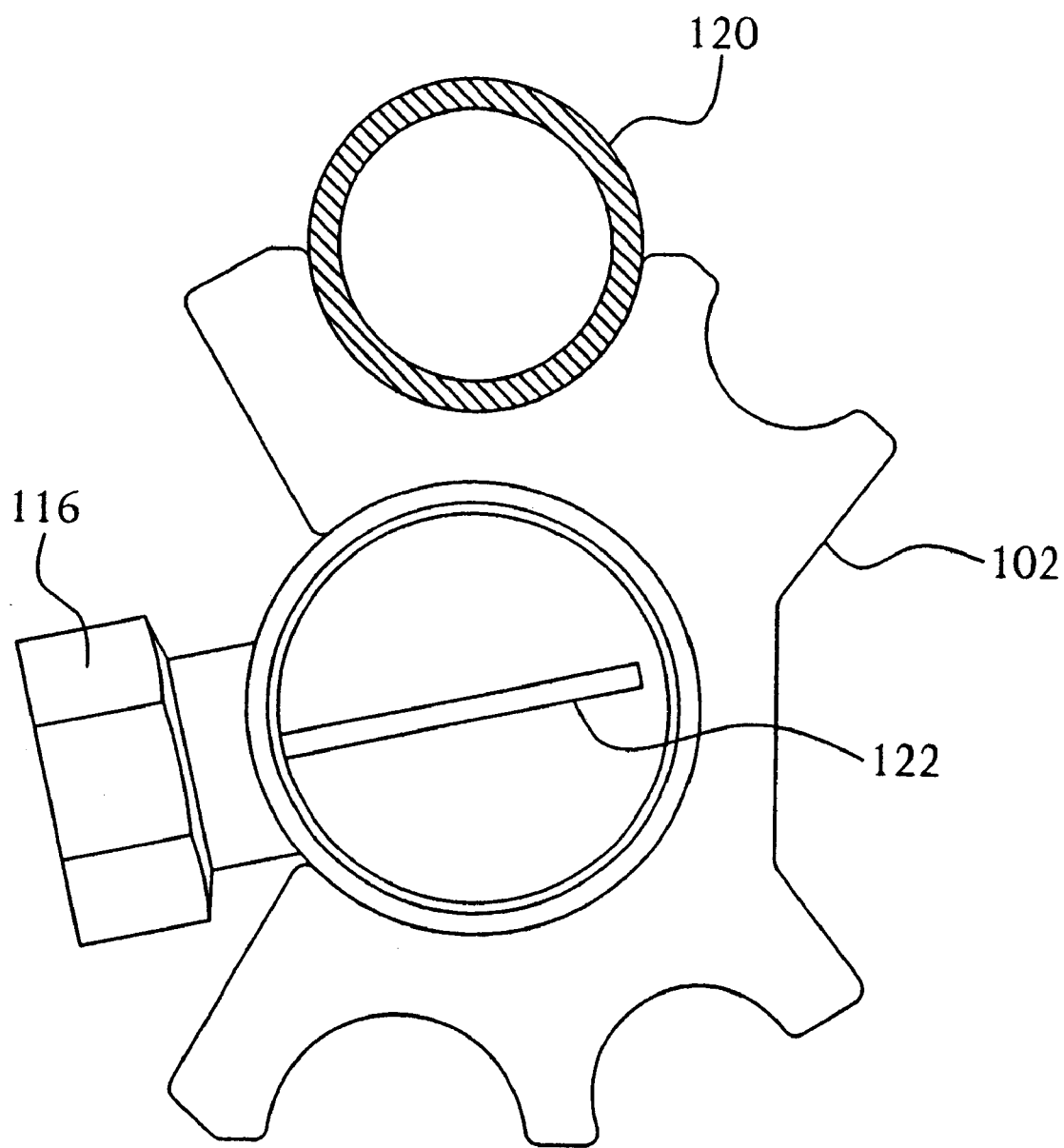
FIG. 4 is a section view of an evaporator chamber and adapter on a pipe.

Referring now to FIG. 4, when the adapter (102) is placed on a water pipe (120), the hose coupling directs the hose in a direction essentially at right angle to the axis of the pipe. The inner tube (122) of the hose projects through the coupling to near the opposite inner wall of the cylinder to spray the liquid refrigerant against the wall. As the refrigerant evaporates, the vapor is drawn back into the coupling to the outer tube of the hose. Since the coupling orients the inner tube essentially perpendicular to the length axis of the chamber, the distance from the end of the inner tube back into the coupling is not as great as when the inner tube is aligned with the length axis. This situation may result in less efficient heat transfer, as some liquid refrigerant may be drawn back into the outer hose and evaporate on return to the compressor rather than in the chamber.

Figure 5:
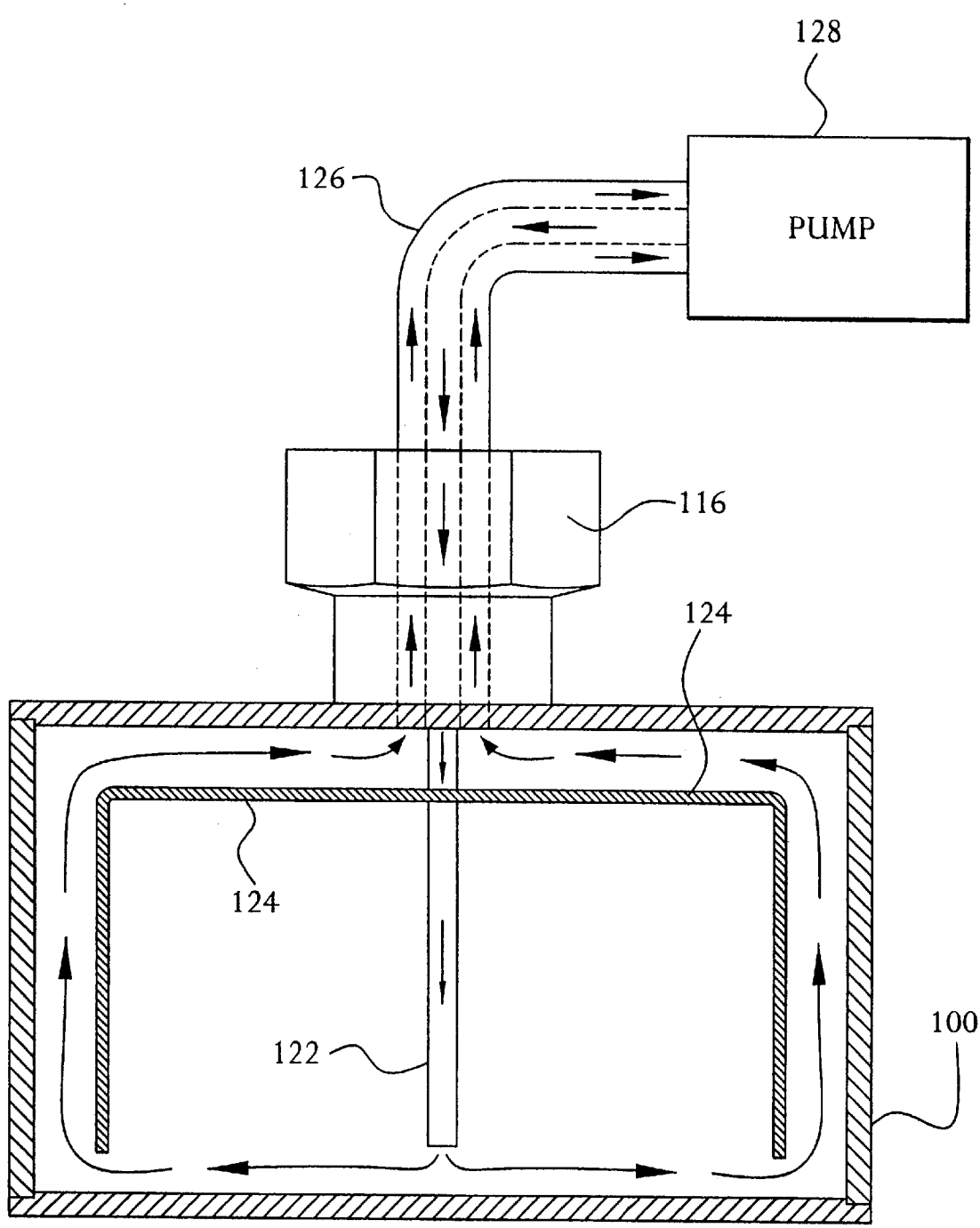
FIG. 5 is a schematic view of an evaporator in section connected to a condenser/compressor unit to show flow path of refrigerant.

To make the refrigerant evaporation in the chamber more efficient, a metal baffle plate (124) is placed in the evaporator head, as shown in FIG. 5. The baffle plate preferably is located in a chord of the cylindrical chamber near the hose coupling and extends toward and nearly to the end walls of the chamber. The baffle plate (124) may be a flat plate extending along the length of the chamber and terminate near the end plates, or as in FIGS. 5 and 6, may then extend along the end plates of the chamber.

The inner tube (122) of the refrigerant hose extends through the baffle plate. Thus, refrigerant sprayed from the inner tube (122) must migrate to the ends of the chamber to pass around the plate (124) and return to the midpoint of the chamber to be pulled into the coupling for return to the compressor/condenser (128) in the outer tube of the hose (126). This longer path makes more evaporation take place in the chamber and promotes more efficient heat exchange.

Figure 6:
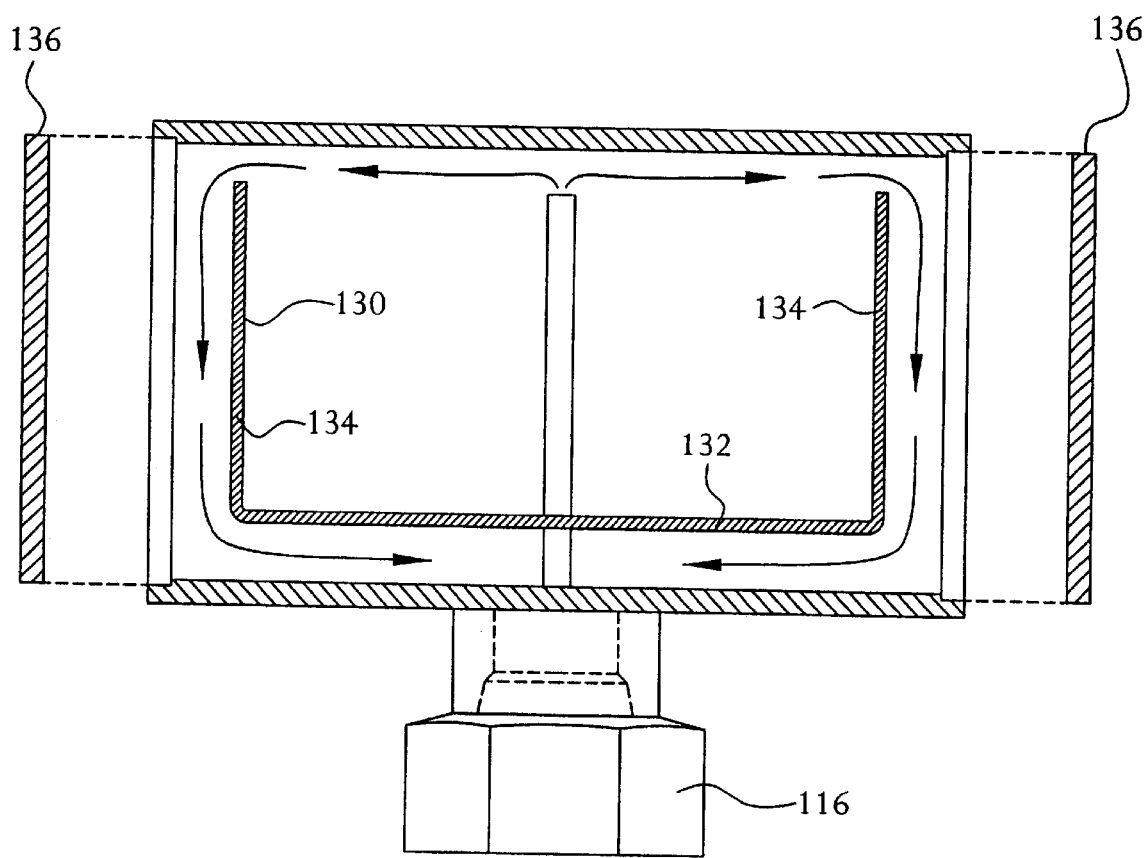
FIG. 6 is a section view of a cylindrical evaporation chamber with a preferred configuration of baffle.

FIGS. 5 and 6 show a preferred configuration of baffle. The baffle (130) is saddle-shaped with a long flat top section (132) and two end sections (134) close to and essentially parallel to the end walls (136) of the cylinder. This creates a large evaporation space inside the baffle and forces the refrigerant to migrate essentially along the perimeter of the chamber before re-entering the hose coupling (116).

Figure 7:
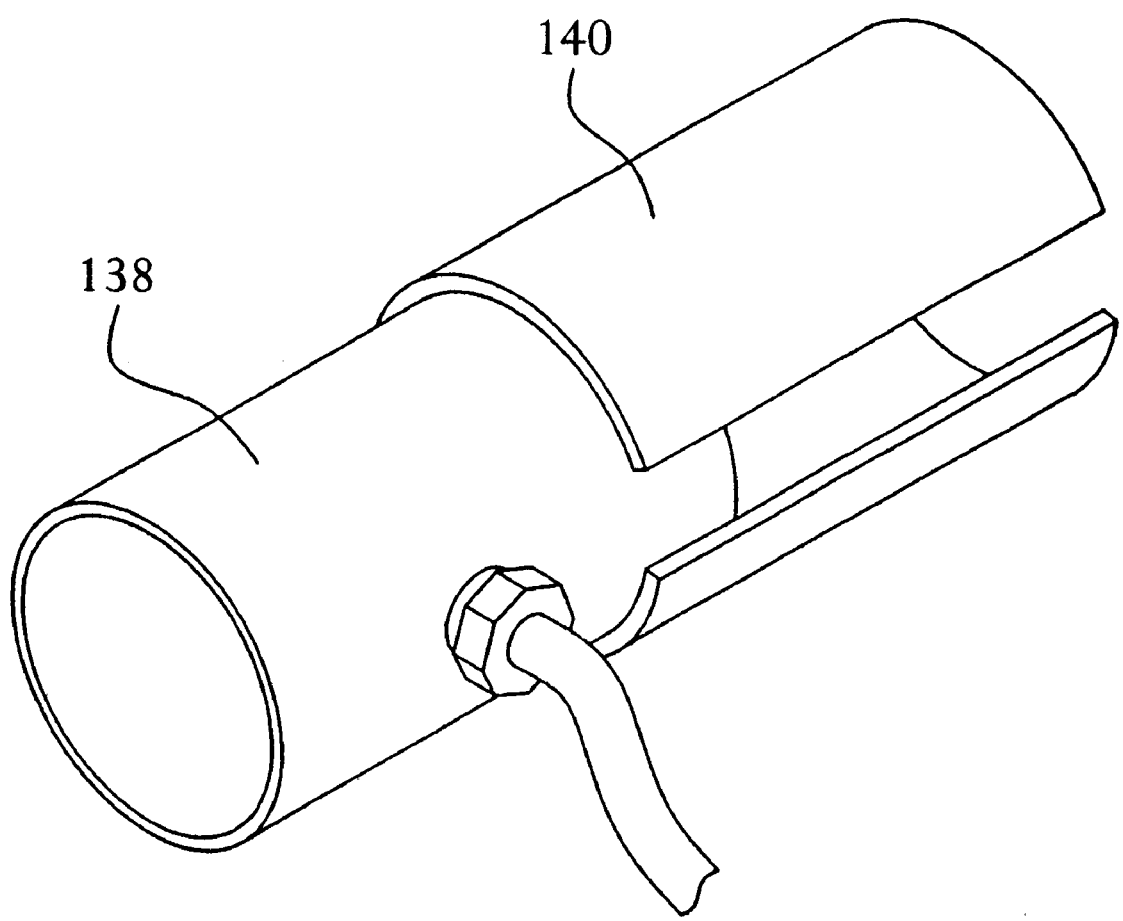
FIG. 7 is a partially exploded view of an evaporation chamber with a replaceable protective sleeve.

FIG. 7 shows another preferred construction of a cylindrical evaporation chamber. The chamber, as described in previous embodiments, is formed as a hollow right cylinder (138) closed at both ends by end plates (136). The cylinder and plates are formed from a heat conductive metal, preferably aluminum. To obtain good heat conduction between the chamber and the adapter, the surface of the cylinder should make a tight conforming fit into the adapter. This smooth fit would be lost if the cylinder became dented or scratched, as softer metals are prone to become in a working environment. To protect the valuable evaporation chamber, it is preferred to install over it a replaceable protective sleeve (140), as shown in FIG. 7. The sleeve is also made of a heat conductive metal, again preferably aluminum. The sleeve has a slot opening to allow the sleeve to slide past the hose coupling onto the cylinder. The adapters are sized to made a tight conformal fit with the sleeve. If the sleeve becomes dented or scratched, it can be replaced at much less cost than the evaporation chamber.

Figure 8:
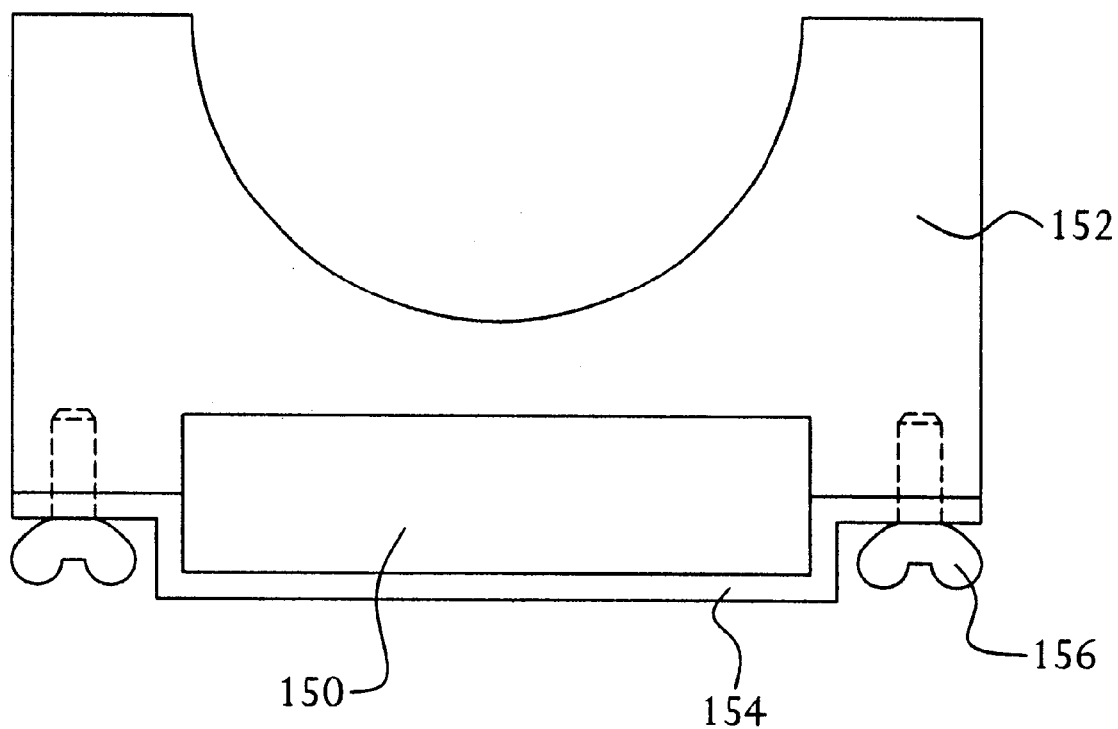
FIG. 8 is a profile view of a rectangular evaporation chamber and an associated adapter.

FIG. 8 shows an alternative shape of evaporation chamber. In the embodiment, the chamber (150) is rectangular in cross section, with its length dimension directed into the paper. The adapter (152) has a rectangular channel for a conformal fit around three sides of the chamber. The rectangular chamber is slide into the adapter, and a bracket (154) is placed over it and held to the adapter by thumbscrews (156) in threaded bores of the adapter. Otherwise, the evaporator is similar to the cylindrical evaporator in that the hose coupling is located approximately midway along the evaporator's length dimension and is oriented perpendicular to the length axis of the chamber. A baffle is preferably located in the chamber between the outlet of the inner tube of the hose and the return to the outer tube to force refrigerant sprayed out of the inner tube to migrate from essentially the midway point of the chamber to an end wall and then back toward the midway point before entering the outer tube.

Other shapes of evaporation chamber could also be used in accordance with the invention. For example, the exterior of the chamber could include flat sides, such as a hexagonal or octagonal cylinder, and the adapters would be correspondingly configured to slide-on over the hexagonal or octagonal exterior.

I claim:

1. A set of adapters for use with a pipe freezer apparatus, the set comprising:
    a plurality of interchangeable adapters, each adapter being constructed of a heat conductive metal and configured with one or more nearly semicircular channels conforming to a selected pipe diameter such that an adapter can be placed along a section of a pipe, each adapter further having a greater than semicircular channel having a radius sufficient to make a slide-on conforming fit over an outer surface of an evaporation head and to receive and hold the evaporation head in thermal communication with the pipe in a position wherein the evaporation head is aligned parallel to the axis of the pipe placed in any of the nearly semicircular channels.

2. A set as in claim 1, wherein the greater than semicircular channel comprises a slot that allows the adapter to slide past a hose coupling protruding from the evaporation head.

3. A set as in claim 2, wherein the length of the slot corresponds to the location of a hose coupling orientated generally perpendicular with the length axis of the evaporation chamber and located midway along the length dimension of the evaporation head.

4. A set as in claim 1, wherein the greater than semicircular channel conforms to the outer diameter of the evaporation head such that the adapter can slide past a hose coupling attached to the evaporation head.

5. A set as in claim 4, wherein the greater than semicircular channel is less than about 330 degrees of arc.

6. A set of adapters for use with a pipe freezer apparatus, the set comprising:
    a plurality of interchangeable adapters, each adapter being constructed of a heat conductive metal and configured with one or more nearly semicircular channels conforming to a selected pipe diameter such that an adapter can be placed along a section of a pipe, each adapter further having a channel into which an evaporation head can slide to receive and hold the evaporation head in thermal communication with the pipe, the channel has a slot formed in it of sufficient width to allow a hose coupling attached to the head to slide through the slot.

7. A set as in claim 6, wherein the slot is of sufficient width so the evaporation head may rotate up to approximately 45 degrees about its longitudinal axis while it is engaged in the adapter.

8. An adapter kit for use with a portable pipe freezer apparatus, the kit comprising:
    a set of at least two interchangeable adapters, each adapter comprising a thermally conductive body, the body having
        a first surface defining a first channel shaped and sized to securely and releasably receive an evaporation head, the first surface having a slot at least at one end, the slot extending substantially parallel to the channel, and
        at least one pipe-engaging surface defining a substantially semi-circular pipe channel having a radius corresponding to a pre-selected pipe diameter.

9. The kit of claim 2 wherein at least one of the adapters comprises a plurality of pipe-engaging surfaces defining pipe channels of different radii.

10. The kit of claim 9 wherein the set of interchangeable adapters includes pairs of adapters, each adapter of a pair having pipe channels of the same radii as its mate, and the pipe channels of each pair having different radii than the pipe channels of the other pairs.

11. The kit of claim 8 wherein the first channel and at least one pipe channel have parallel longitudinal axes.

12. An adapter kit for use with a portable pipe freezer apparatus, the kit comprising:
    a set of at least two interchangeable adapters, each adapter comprising a thermally conductive body, the body having
        a first surface having an arcuate cross-section greater than 180 degrees and less than 360 degrees, the first surface defining a first channel shaped and sized to securely and releasably receive an evaporation head, and
        at least one pipe-engaging surface defining a substantially semi-circular pipe channel having a radius corresponding to a pre-selected pipe diameter; and
    at least one of the adapters comprising a plurality of pipe-engaging surfaces defining pipe channels of different radii.

13. An adapter kit for use with a portable pipe freezer apparatus, the kit comprising:
    a set of at least two interchangeable adapters, each adapter comprising a thermally conductive body, the body having
        a first surface defining a first channel shaped and sized to securely and releasably receive an evaporation head, the first channel having a cross-sectional area greater than half of the cross-sectional area of the evaporation head and less than the entire cross-sectional area of the evaporation head, and
        at least one pipe-engaging surface defining a substantially semi-circular pipe channel having a radius corresponding to a pre-selected pipe diameter; and
    at least one of the adapters comprising a plurality of pipe-engaging surfaces defining pipe channels of different radii.

14. A pipe freezer apparatus comprising:
    a condenser/compressor unit in fluid communication with a remote evaporation head; and
    a set of interchangeable adapters for facilitating thermal communication between the evaporation head and pipes of different diameters, each adapter comprising a thermally conductive body, the body having
        a first surface defining a first channel shaped and sized to securely and releasably receive the evaporation head,
        a slot in at least one end of the body and extending into the first channel, the slot being substantially parallel with the first channel and having sufficient width to allow a hose coupling attached to the evaporator head to slide through the slot, and
        at least one pipe-engaging surface defining a substantially semi-circular pipe channel having a radius corresponding to a pre-selected pipe diameter.

15. The pipe freezer apparatus of claim 14 wherein the set of interchangeable adapters includes at least one adapter having a plurality of said pipe-engaging surfaces defining pipe channels of different radii.

16. The pipe freezer apparatus of claim 14 further comprising a second evaporation head, wherein the set of interchangeable adapters includes pairs of adapters, each adapter of a pair having pipe channels of the same radii as its mate, and the pipe channels of each pair having different radii than the pipe channels of the other pairs.

17. An adapter for facilitating thermal communication between an evaporation head and pipes of different diameters, the adapter comprising
   a thermally conductive body, the body having
      a first surface defining a first channel shaped and sized to securely and releasably receive the evaporation head,
      a slot at least at one end of the body, the slot being adjacent the first surface, parallel with the first channel, and having sufficient width to allow a hose coupling attached to the evaporator head to slide through the slot, and
      at least one pipe-engaging surface defining a substantially semi-circular pipe channel having a radius corresponding to a pre-selected pipe diameter.

18. A set of adapters for use with a pipe freezer apparatus, the set comprising:
   a first adapter constructed of a heat conductive metal and configured with one or more arcuate channels adapted to conform to a selected pipe diameter;
   a second adapter constructed of a heat conductive metal and configured with one or more arcuate channels adapted to conform to a selected pipe diameter, the second adapter includes an evaporator channel, at least a portion of the evaporator channel having a cross-sectional area greater than half of the cross-sectional area of an evaporation head and less than the entire cross-sectional area of the evaporation head, the evaporator channel adapted to slide-on an outer surface of the evaporation head for receiving and holding the evaporation head in thermal communication with the second adapter.

19. A set of adapters for use with a pipe freezer apparatus, the set comprising:
   a first solid adapter constructed of a heat conductive material and configured with one or more arcuate channels adapted to conform to a selected pipe diameter;
   a second solid adapter constructed of a heat conductive material and configured with one or more arcuate channels adapted to conform to a selected pipe diameter, the second adapter including an evaporator channel adapted to contact and be secured to an outer surface of an evaporation head for providing thermal communication between the evaporator head and the second adapter, and a slot formed in a portion of the adapter and extending through to the evaporator channel, the slot adapted to allow a hose coupling attached to an evaporator head to slide through the slot.

* * * * *